United States Patent [19]
Snyder

[11] Patent Number: 5,581,414
[45] Date of Patent: Dec. 3, 1996

[54] MICROLENS ASSEMBLIES AND COUPLERS

[75] Inventor: James J. Snyder, San Jose, Calif.

[73] Assignee: Blue Sky Research Incorporated, Santa Cruz, Calif.

[21] Appl. No.: 20,584

[22] Filed: Feb. 22, 1993

[51] Int. Cl.$^6$ .............................. G02B 7/02; G02B 3/06; H01S 3/08
[52] U.S. Cl. ........................... 359/819; 359/710; 372/101
[58] Field of Search ................................... 359/619, 642, 359/668, 710, 819–820; 385/32–34; 372/101

[56] References Cited

U.S. PATENT DOCUMENTS

| | | | |
|---|---|---|---|
| 3,894,789 | 7/1975 | Kobayashi et al. | 385/34 |
| 4,362,367 | 12/1982 | Hammer et al. | 359/710 |
| 5,081,639 | 1/1992 | Snyder et al. | 372/101 |
| 5,095,386 | 3/1992 | Scheibengraber | 359/710 |
| 5,121,254 | 6/1992 | Hamanaka et al. | 359/619 |
| 5,177,641 | 1/1993 | Kobayashi et al. | 359/819 |
| 5,181,224 | 1/1993 | Snyder | 372/101 |
| 5,206,878 | 4/1993 | Sizer, II | 372/101 |

FOREIGN PATENT DOCUMENTS 204018  12/1982  Japan ................................ 359/668

OTHER PUBLICATIONS

"Connectorized Optical Link Package Incorporating a Microlens" Johnson et al, pp. 279–282.

Primary Examiner—Thong Nguyen
Attorney, Agent, or Firm—Joseph H. Smith

[57] ABSTRACT

Disclosed is a lens assembly having a first cylindrical microlens having a first microlens longitudinal axis. A flat sheet of material having a hole therein is attached to the microlens, with the microlens traversing the hole. The microlens is oriented with the first microlens longitudinal axis being parallel to the flat sheet, such that the microlens can be illuminated through the hole. In a second embodiment, a second microlens is attached on the opposite side of the sheet and is oriented at an angle relative to the first microlens.

7 Claims, 5 Drawing Sheets

MICROLENS ASSEMBLIES AND COUPLERS

CROSS-REFERENCE TO RELATED APPLICATIONS

This invention is related to application Ser. No. 07/591,462 entitled METHOD AND FABRICATION OF CYLINDRICAL MICROLENSES OF SELECTED SHAPE, by James J. Snyder and Thomas M. Baer now U.S. Pat. No. 5,080,706; to application Ser. No. 07/591,409, entitled LASER DIODE ASSEMBLY INCLUDING A CYLINDRICAL LENS, filed Oct. 1, 1990 by James J. Snyder and Patrick Reichert now U.S. Pat. No. 5,081,639; and to application Ser. No. 07/697,974, entitled MICROPTIC LENSES, by James J. Snyder now U.S. Pat. No. 5,181,224. All of these references are hereby incorporated by reference.

BACKGROUND OF THE INVENTION

The present invention relates generally to cylindrical microlenses and more particularly to mounting systems and couplers for such microlenses.

Due to the small size of cylindrical microlenses, which are typically less than 1 mm in maximum cross-sectional extent, handling of these microlenses is difficult. Hence, mounting them and attaching them to optical systems can be very tedious even for experienced users. What is needed is more easily handled package for systems containing cylindrical microlenses.

SUMMARY OF THE INVENTION

In accordance with preferred embodiments of the invention, disclosed is a lens assembly having a first cylindrical microlens having a first microlens longitudinal axis. A flat sheet of material having a hole therein is attached to the microlens, with the microlens traversing the hole. The microlens is oriented with the first microlens longitudinal axis being parallel to the flat sheet, such that the microlens can be illuminated through the hole.

In practice this assembly has been found even more useful for crossed microlens combinations. In accordance with preferred embodiments of the invention, disclosed is a lens assembly which includes a first cylindrical microlens having a first microlens longitudinal axis, the first cylindrical microlens located adjacent a first plane. A second cylindrical microlens having a second microlens longitudinal axis is located adjacent a second plane that is spaced apart from, and parallel to, the first plane, with the second microlens longitudinal axis being oriented at an angle relative to the first microlens longitudinal axis and the second microlens being located relative to the first microlens such that electromagnetic radiation passing through a portion of the first microlens will pass through a portion of the second microlens. A spacer element is located between the first plane and the second plane and is attached to the first microlens and to the second microlens for holding the first microlens and the second microlens in fixed relationship relative to each other adjacent their respective planes. The spacer element is configured to permit electromagnetic radiation from the portion of the first microlens to pass through the portion of the second microlens.

Although there are many applications for the crossed microlens assembly, two are specifically described. The first is for coupling a laser diode into and optical fiber, and the second is for coupling two optical fibers together.

BRIEF DESCRIPTION OF THE DRAWINGS

Shown in FIG. 1A is a first view of a microlens assembly according to the invention in which the plane of the paper is parallel to the optic axis of the microlens assembly;

Shown in FIG. 1B is a second view of the microlens assembly of FIG. 1A in which the plane of the paper is again parallel to the optic axis of the microlens assembly but orthogonal to the view of FIG. 1A;

Figure 1A:
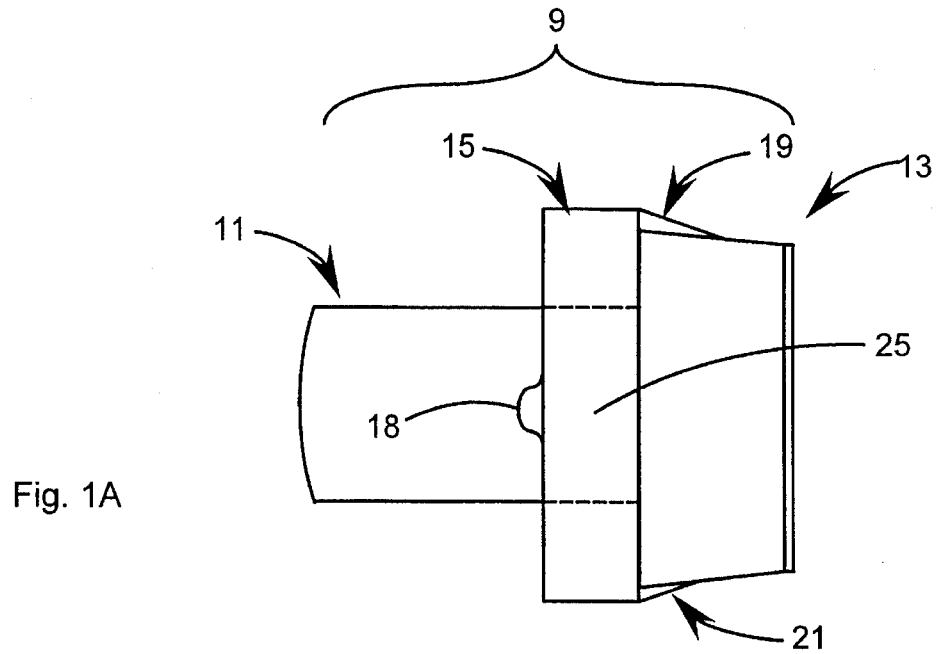
Figure 1B:
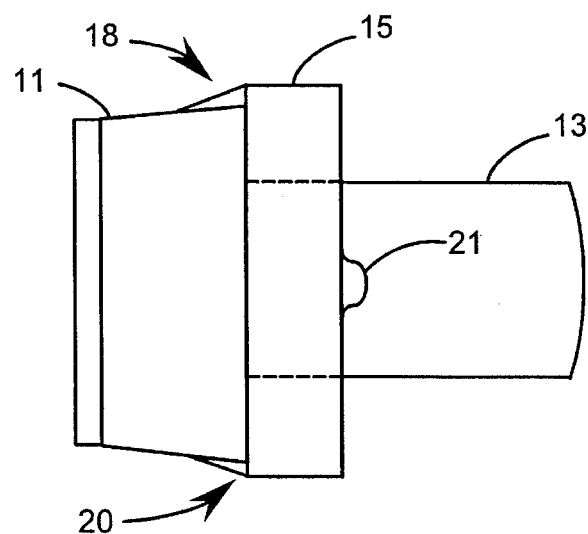
Figure 1C:
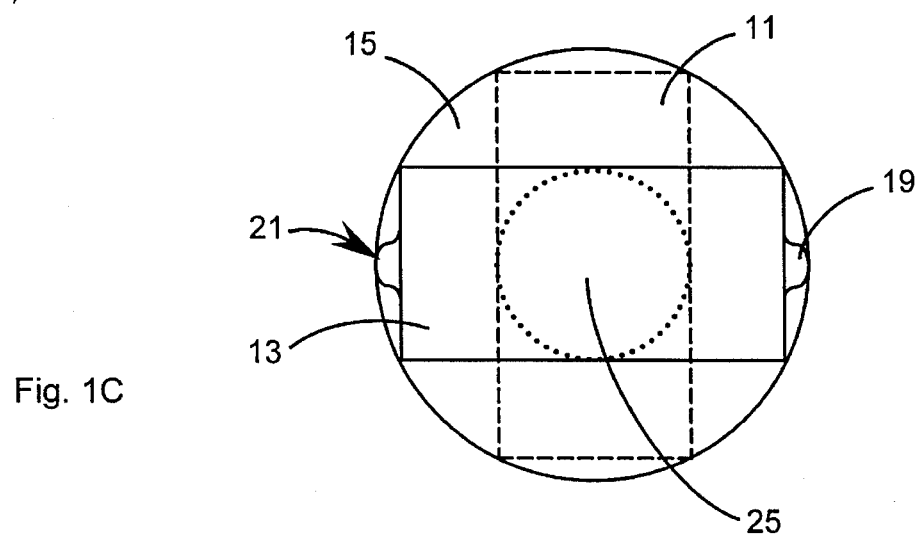
Figure 2A:
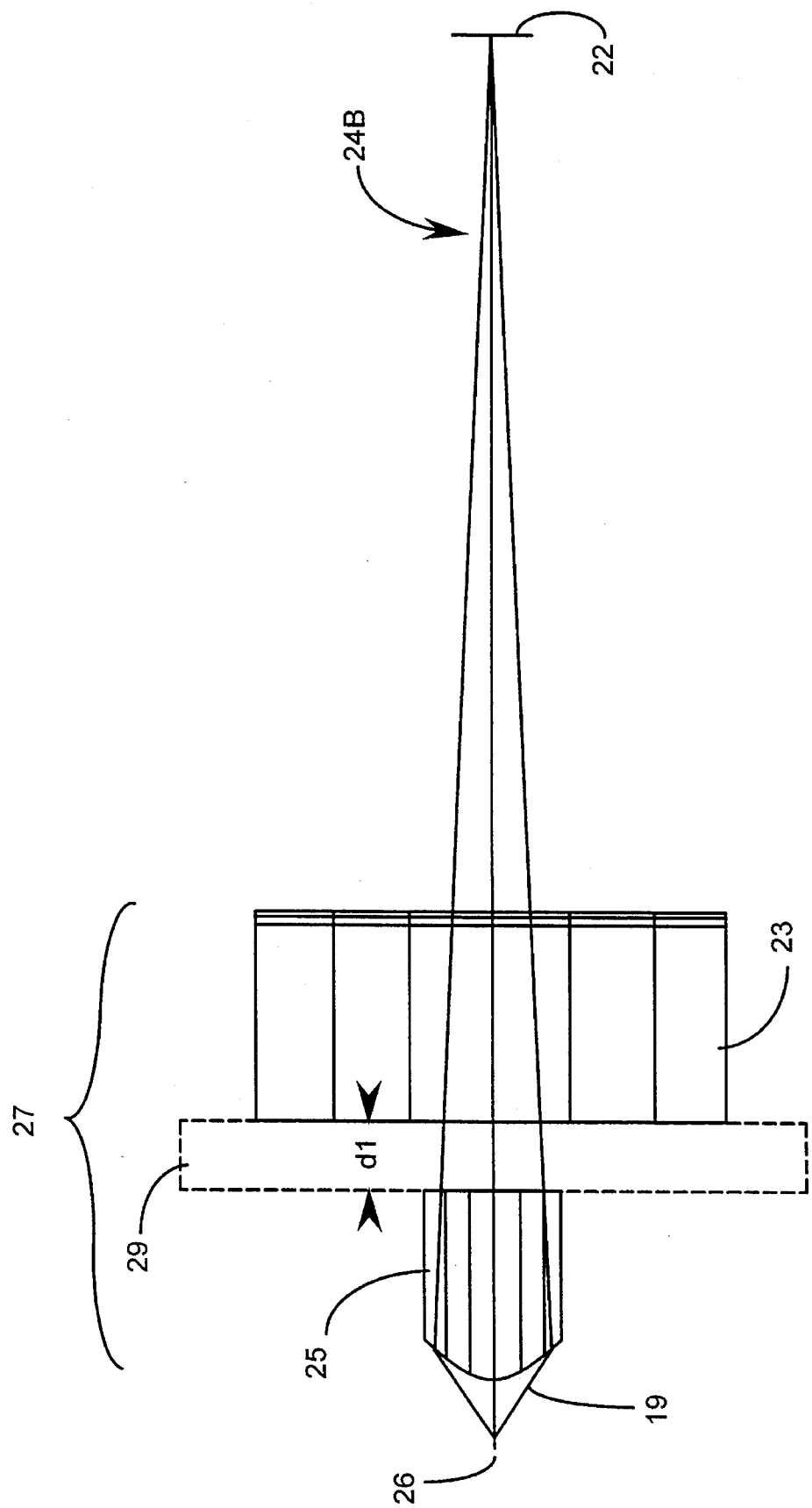
Figure 2B:
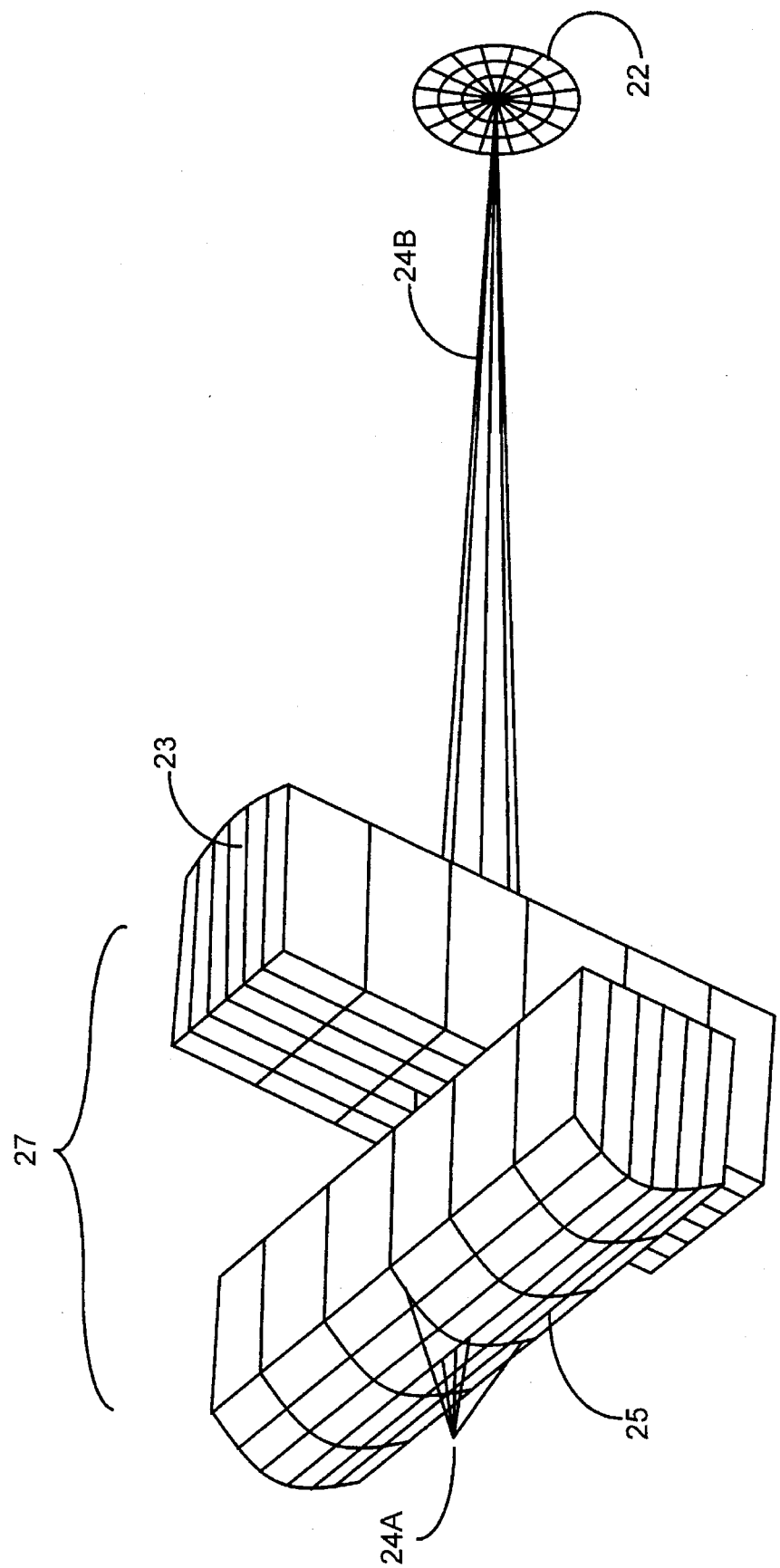
Figure 3A:
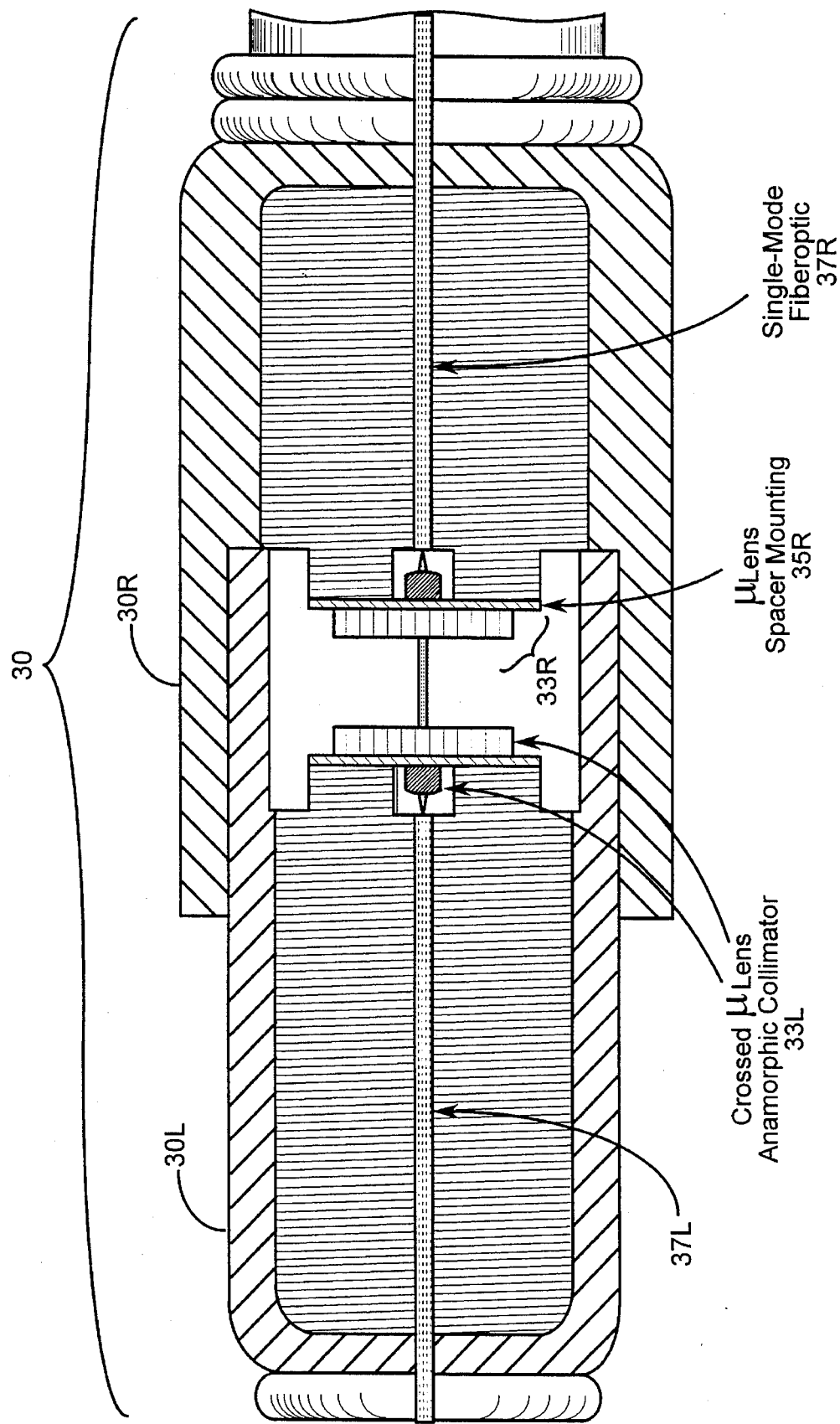

Shown in FIG. 1C is a third view of the microlens assembly of FIG. 1A in which the plane of the paper is orthogonal to the optic axis of the microlens assembly;

FIG. 2A shows a wire frame diagram of a microlens assembly according to the invention for a single mode coupler as generated by a ray trace program;

FIG. 2B shows a solid model of the invention of FIG. 2A as generated by the ray trace program;

FIG. 3A shows a fiber—fiber connector assembly according to the invention; and

Figure 3B:
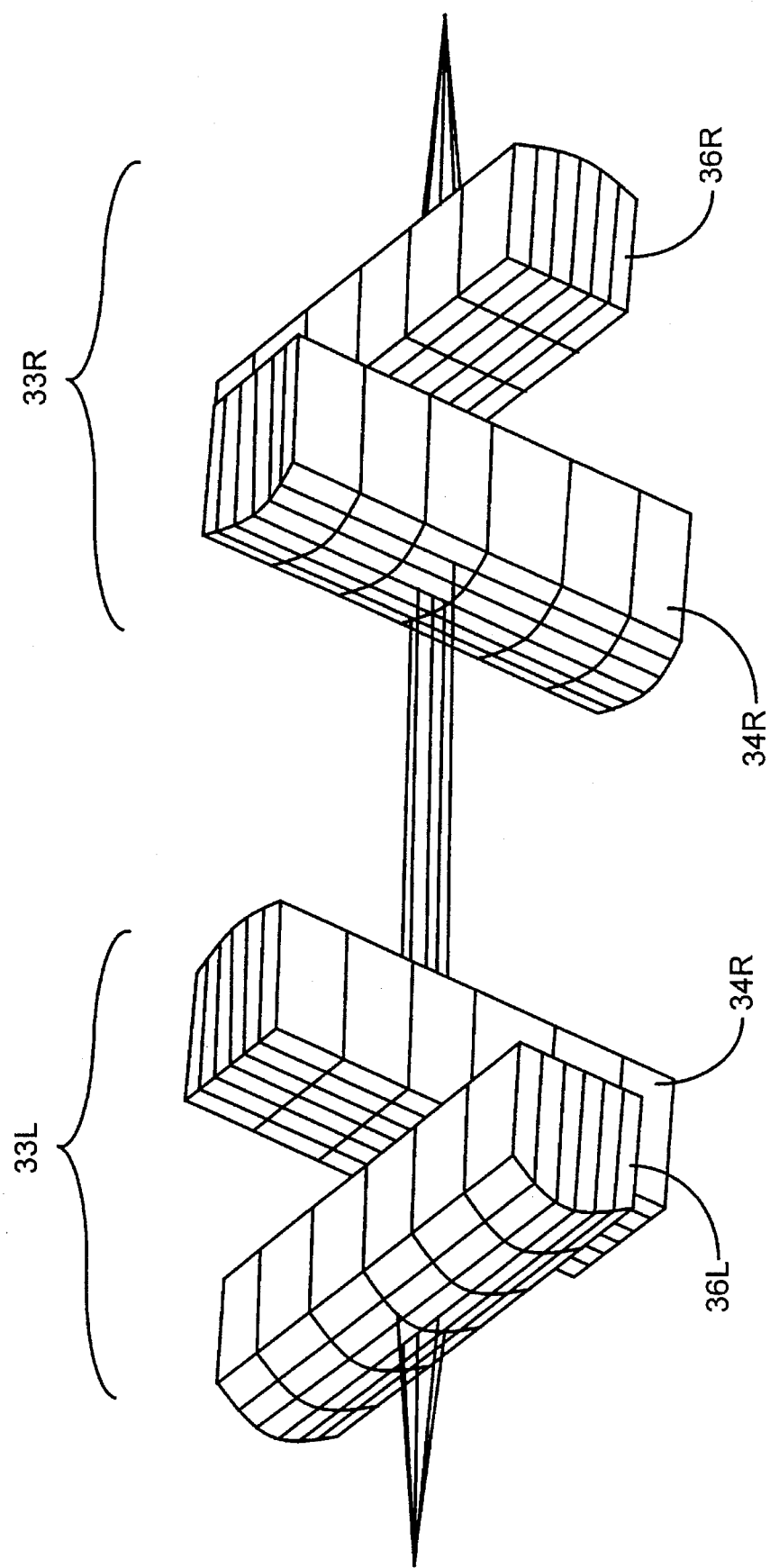

FIG. 3B shows a solid model of the invention illustrated in FIG. 3A as generated by the ray trace program.

DETAILED DESCRIPTION OF THE PREFERRED EMBODIMENTS

Shown in FIGS. 1A, 1B, and 1C, are three views of a microlens system 9 according to a preferred embodiment of the invention in which two crossed microlenses 11 and 13 are separated by a spacer 15. Spacer 15 has a hole 25 at its center, so that it is essentially a flat washer, such as might be used with a nut and bolt. Hence, light traversing the middle portion of one microlens will also pass through the middle portion of the other microlens unimpeded by the washer material. Essentially, hole 25 acts as an aperture for the system, particularly if the washer material is not transparent at the wavelength at which the microlens system is being used. Typically the microlenses are constructed of pulled glass in accordance with the methods disclosed in the U.S. patent applications described above. Although the spacer 15 is typically an annulus with an outer diameter of about 1.5 to 2 mm and an inner diameter of about 0.3 to 0.5 mm, these dimensions are typically not critical since they are chosen to be an easily handled size for the system and the desired aperture for the crossed microlenses. Further, it should be appreciated that the particular shape of the outer dimension of the spacer need not be circular, but is determined by the application. In most instances, the spacer provides a useful surface to use for mounting the microlens system. Hence, if it is desired to attach the microlens system to an apparatus that is rectangular, it might be more appropriate for the spacer to be rectangular in shape. Similarly, since the hole 25 acts as an aperture, it may be desirable for it not to be circular either. For example, an elliptical aperture may be desired. In the preferred mode, the spacer is typically made from a flat sheet of metal, and has a thickness of a few hundred microns. However, those skilled in the art will appreciate that the particular materials for the washer are generally not of critical importance, and could be many other things, for example, but not limited to, glass, metal coated glass, plastic, silicon. What is important is that the material be uniform and stable in the environment in which the lens system is to be used, so that the separation between the lenses is stable and uniform. From one microlens system to another, the particular thickness of the spacer can vary over a wide range, depending on the application. However, it is generally important to know what the thickness is, since the design of microlenses 11 and 13 to obtain optimal performance for the system typically depends on knowing the thickness of the washer.

To construct the microlens system, one of the microlenses, say microlens 13, is attached to the washer. In the preferred mode, this is done by placing the microlens against the washer and using small volumes of cement 19 and 21 where the microlens touches the washer. Care is taken so as not to get cement between the microlens and the washer, since that would unpredictably change the spacing between the microlens and the washer. Rather, the cement lays on the surface of both the microlens and the spacer as illustrated. Once microlens 13 is attached, the washer is turned over, and the other microlens 11 is attached in place, typically the same manner. FIGS. 1A and 1B show the corresponding small volumes of cement 18 and 20 used to attach microlens 11. Those skilled in the art will appreciate that cement is also not the only means to attach the microlenses to the spacer.

Various applications for crossed microlenses have been discussed in U.S. patent application Ser. No. 07/697,974, by James J. Snyder, which include a single mode coupler, and a single mode fiber connector. Both of these applications are more easily handled with the spacer geometry as described above. The following provides specific examples of these applications.

EXAMPLE 1: Single Mode Coupler

Shown in FIG. 2A is a "wire frame" diagram of an single mode coupler lens system 27 in accordance with a preferred embodiment of the invention, which is shown in cross-section in a plane lying on the longitudinal axis of a cylindrical microlens 23. (The wire frame diagram will be used in this description since that is the typical presentation method in the art now that computer ray tracing programs have become prevalent.) A light source 26, which is typically a single mode laser diode (which typically have astigmatism), provides a beam 24A, which is elliptical in cross-section, and traverses microlenses 25 and 23. Spacer 29, the outline of which is shown by dotted lines, is not illustrated by the ray tracing program, since for optical purposes it is simply an airspace between microlenses 23 and 25. The distance d1 between the lenses corresponds to the thickness of the spacer 29. Beam 24A is transformed to beam 24B by the microlenses which then impinges on the end of a single mode fiber 22. Beam 24B is optimized for coupling into the fiber. FIG. 2B shows a solid model of the single mode coupler lens system 27 as generated by the ray tracing program.

EXAMPLE 2: Single Mode Fiber Connector

Shown in FIG. 3A is a fiber—fiber connector assembly 30, having an inner connector 30L and an outer connector 30R for coupling light from a single mode fiberoptic 37R to a single mode fiberoptic 37L. Each connector has it own crossed microlenses system 33L and 33R, respectively. Each microlens system is attached via its spacer mounting, such as illustrated for spacer mounting 35R. FIG. 3B shows a solid model of the optical system as generated by the computer ray tracing program showing the individual lenses 36L and 34L which make up the crossed microlens combination for lens system 33L, and individual lenses 34R and 36R which make up lenses 33R. Again, the ray trace program does not show the spacers, since these are represented by air gaps. Those skilled in the art will understand that the relative orientation of the two pairs of microlens systems should be as shown due to the elliptical nature of the beam therebetween.

Those skilled in the art will realize that there are many other embodiments of crossed microlenses that would benefit from using a spacer as a lens holder and mounting element. Hence, these examples have been intended to be merely illustrative of the various uses that could be made. It should also be realized that due to the small size of these microlenses, that in some situations even a single microlens can benefit from being attached to a spacer/washer according to the invention in order to ease the handling of these microlenses. Those skilled in the art will also understand that in some instances, e.g. for environmental isolation that it may be beneficial not to have a hole in the spacer between two crossed microlenses. In that instance, a transparent spacer can be used. Such a system however, is typically not preferred since the microlenses must be optically contacted with the spacer, typically with cement. Hence, the benefits of having very precise control over the separation between the microlenses is not as good in that embodiment. Those skilled in the art will also realize that although the crossed microlens systems described above have all had the orientation of the longitudinal axes of the microlenses crossing at right angles, there are likely to be situations where the preferred angle is different than ninety degrees.

I claim:

1. A lens assembly module consisting of:

a first cylindrical microlens having a first microlens longitudinal axis, said first cylindrical microlens located adjacent a first plane;

a second cylindrical microlens having a second microlens longitudinal axis, said second microlens located adjacent a second plane that is spaced apart from, and parallel to, said first plane, said second microlens longitudinal axis being oriented at an angle relative to said first microlens longitudinal axis and said second microlens being located relative to said first microlens such that electromagnetic radiation passing through a portion of said first microlens will pass through a portion of said second microlens;

a spacer element located between said first plane and said second plane and attached to said first microlens and to said second microlens in said first plane and said second plane, respectively, said spacer element configured for holding said first microlens and said second microlens in fixed relationship relative to each other adjacent their respective planes, said spacer element configured to permit electromagnetic radiation from said portion of said first microlens to pass through said portion of said second microlens.

2. A lens assembly module as in claim 1 wherein said angle of orientation is ninety degrees.

3. A lens assembly module as in claim 1 wherein said spacer element comprises a solid material having a thickness equal to the spacing between said first plane and second plane.

4. A lens assembly module as in claim 3 wherein said solid material has a hole therein for permitting electromagnetic radiation passing through said portion of said first microlens to pass through said portion of said second microlens without having to pass through said solid material.

5. A lens assembly module as in claim 4 wherein said hole acts as an aperture stop for electromagnetic radiation passing through both of said first and second microlenses.

6. A lens assembly module as in claim 3 wherein said solid material is transparent to electromagnetic radiation in a range of frequencies.

7. A lens assembly module as in claim 1 wherein said spacer element comprises a flat washer.

\* \* \* \* \*